United States Patent [19]

Miyazawa et al.

[11] 4,212,141
[45] Jul. 15, 1980

[54] LAWN MOWER

[75] Inventors: Takeshi Miyazawa, Wako; Takeo Ogano, Kawagoe; Naotoshi Ono, Sayama, all of Japan; Kazunobu Sato, Torrance, Calif.

[73] Assignee: Honda Giken Kogyo Kabushiki Kaisha, Tokyo, Japan

[21] Appl. No.: 6,569

[22] Filed: Jan. 26, 1979

[30] Foreign Application Priority Data

Feb. 2, 1978 [JP] Japan .............................. 53-12144[U]

[51] Int. Cl.² ........................................... A01D 35/26
[52] U.S. Cl. .................... 56/11.8; 56/11.3; 56/DIG. 18
[58] Field of Search ................ 56/11.3, 11.6, 11.7, 56/11.8, DIG. 18

[56] References Cited

U.S. PATENT DOCUMENTS

| | | | |
|---|---|---|---|
| 2,689,620 | 9/1954 | Hainke | 56/11.8 |
| 4,159,614 | 7/1979 | Thomas et al. | 56/11.8 |

*Primary Examiner*—Jay N. Eskovitz
*Attorney, Agent, or Firm*—Polster, Polster and Lucchesi

[57] ABSTRACT

A lawn mowing machine of a self-driving type having a rotating and stopping device for a lawn cutting blade and a driving and stopping device for the machine body, in which a gripping lever for on-and-off operations of the rotating and stopping device for the cutting blade is operable independently of a gripping lever for on-and-off operations of the driving and stopping device for the machine body, while the latter-mentioned lever, when it is gripped, is engaged with the former-mentioned lever to move it in an operative direction, thereby maintaining it in an operative state.

11 Claims, 22 Drawing Figures

LAWN MOWER

BACKGROUND OF THE INVENTION

This invention relates to a lawn mower, and, more particularly, it is concerned with a self-driving type lawn mowing machine provided with a rotating and stopping device for a cutting blade and a starting and stopping device for the machine main body, in which the lawn mowing operation in its self-driving mode and in its hand-pushing mode can be effected sufficiently by gripping a single operating lever.

Heretofore, the lever for operating the blade rotating and stopping device and the lever for machine body driving and stopping device have been separate and independent, and no mutual relationship exists between them. Therefore, when the lawn mowing is to be carried out in the self-driving mode, it is necessary to continuously grip one lever by one hand, while continuously gripping the other lever by another, which causes both hands to be always kept in the lever gripping conditions. This is very inconvenient.

Or, when the abovementioned both levers are made into a single common lever, with which the on-and-off operations of both devices are to be conducted together, the lawn mowing operation becomes always conducted in the self-driving mode, and it cannot be done in the hand-pushing mode when the lawn mowing work is to be conducted at a narrow space, etc.

SUMMARY OF THE INVENTION

The present invention, in view of the foregoing, is aimed at providing a construction such that the lawn mowing operation in the hand-pushing mode as well as in the self-driving mode may be sufficiently done with a single operating lever. That is, the gripping lever for the on-and-off operations of the cutting blade can be operated independently of the lever for the on-and-off operations of the machine for its self-driving mode, but the lever for the on-and-off operations of the machine for its self-driving mode becomes engaged with the lever for the on-and-off operations of the blade when the former lever is gripped so that the lever for the on-and-off operations of the blade may be rotated to its operative direction to maintain its rotational condition.

According to the present invention, generally speaking, there is provided a lawn mower comprising: a machine body; a prime mover having an output shaft extending therefrom, and mounted on one part of said machine body; a lawn cutting blade operatively joined to said output shaft; means for rotating and stopping said lawn cutting blade; means for driving and stopping said machine body in a self-driving mode; pulley means to interlock said means for rotating and stopping said lawn cutting blade and said means for driving and stopping said machine body in a self-driving mode; a steering handle extending from said machine body; first lever means provided at one part of said steering handle for on-and-off operation of said rotating and stopping means for said cutting blade; and second lever means also provided at one part of said steering handle and in contiguity to said first lever means for on-and-off operations of said driving and stopping means for said machine body, said first lever means being operable independently of said second lever means, and said second lever means, when gripped, being engaged with said first lever means to cause said first lever means to rotate in its operative direction, and maintain the same at its operational position.

There has thus been outline, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purpose of illustration and description, and are shown in the accompanying drawing, forming a part of the specification, in which.

Figure 5:
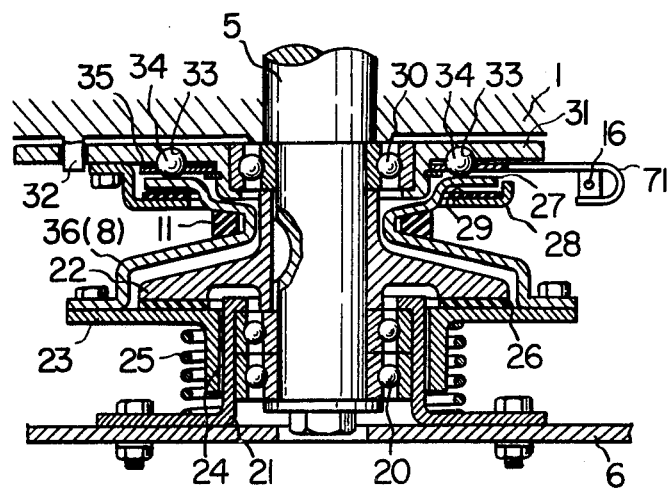
Figure 6:
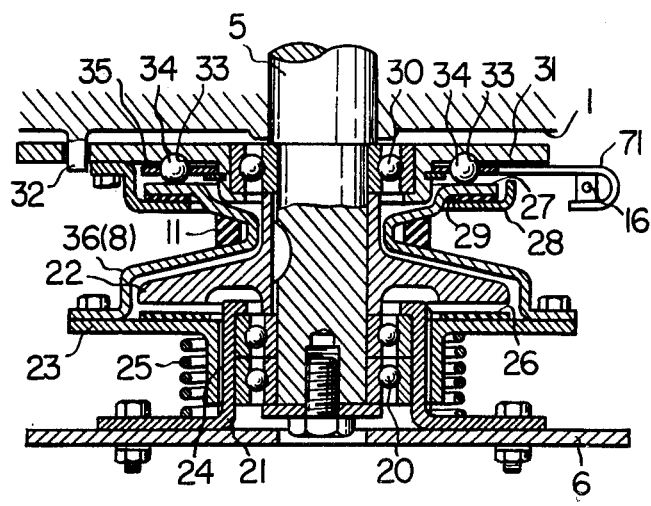
Figure 7:
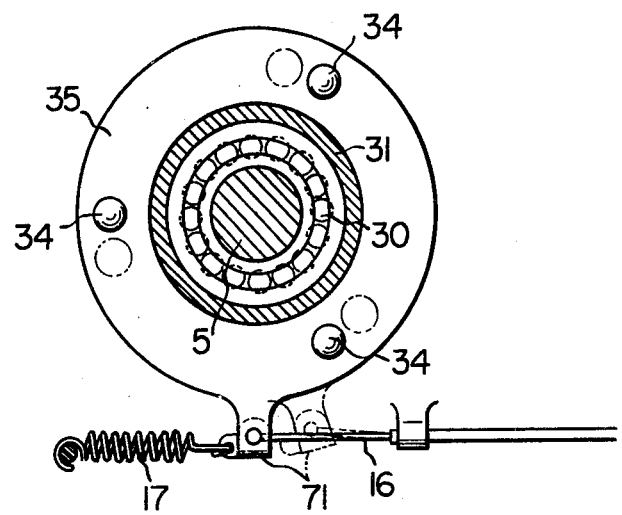
Figure 8:
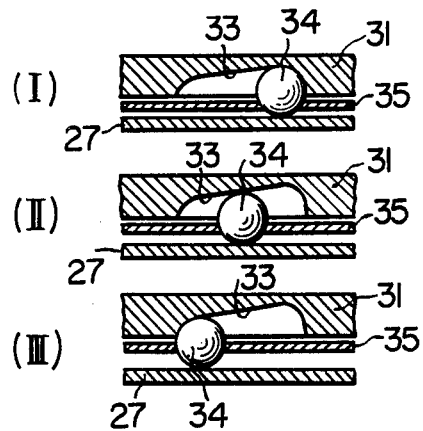
Figure 9:
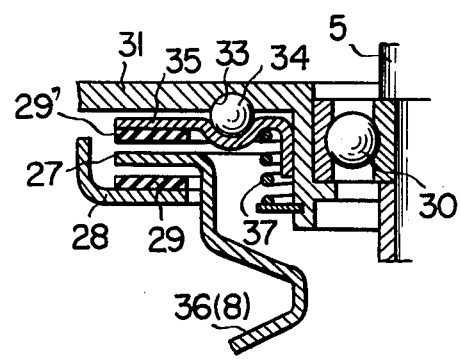
Figure 10:
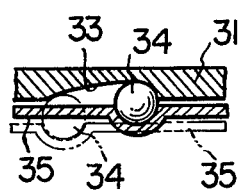
Figure 11:
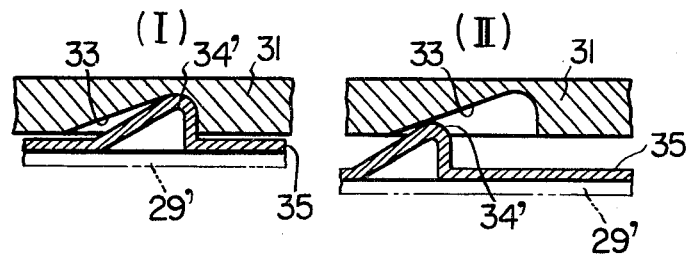
Figure 12:
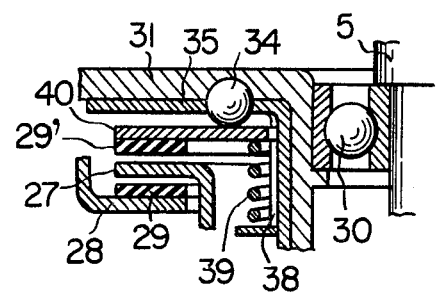
Figure 13:
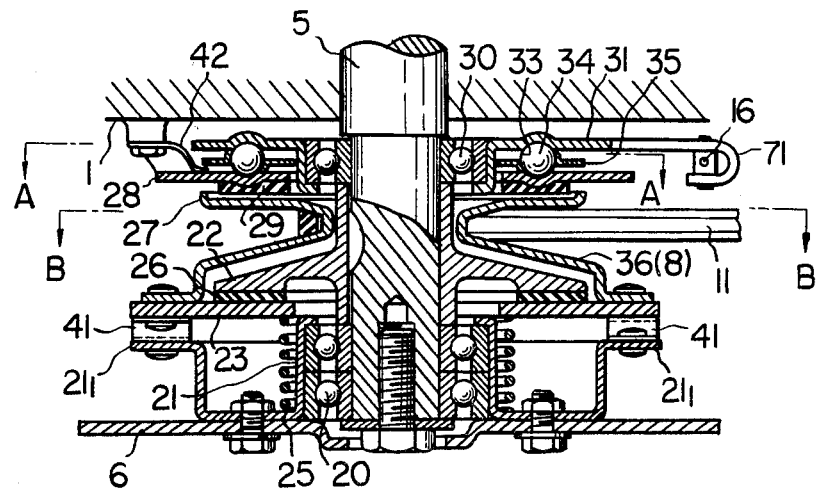
Figure 14:
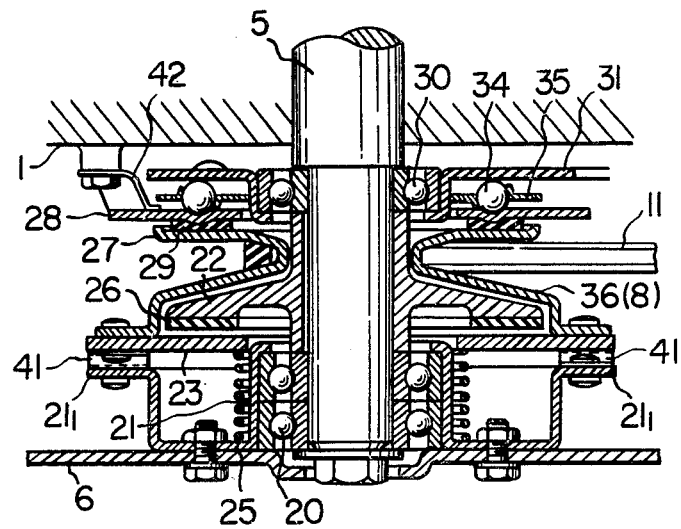
Figure 15:
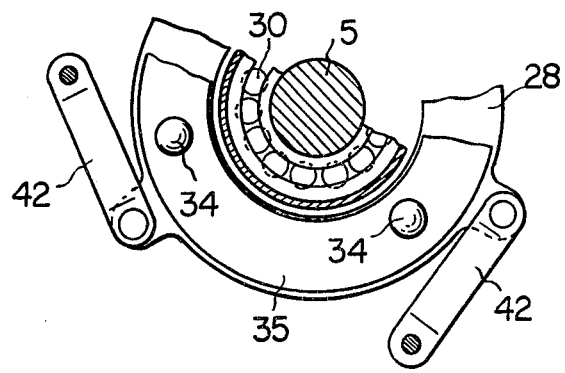
Figure 17:
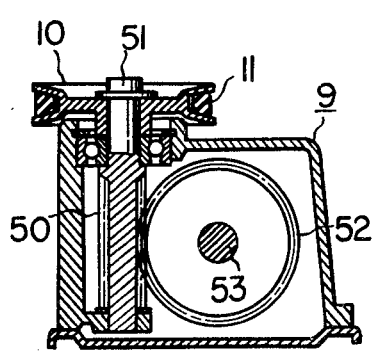
Figure 18:
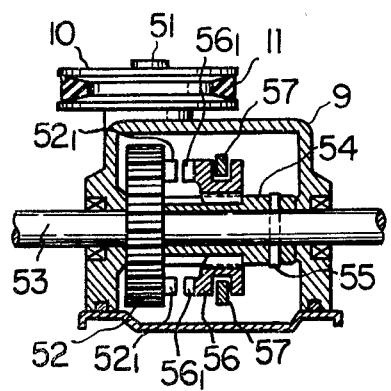
Figure 16:
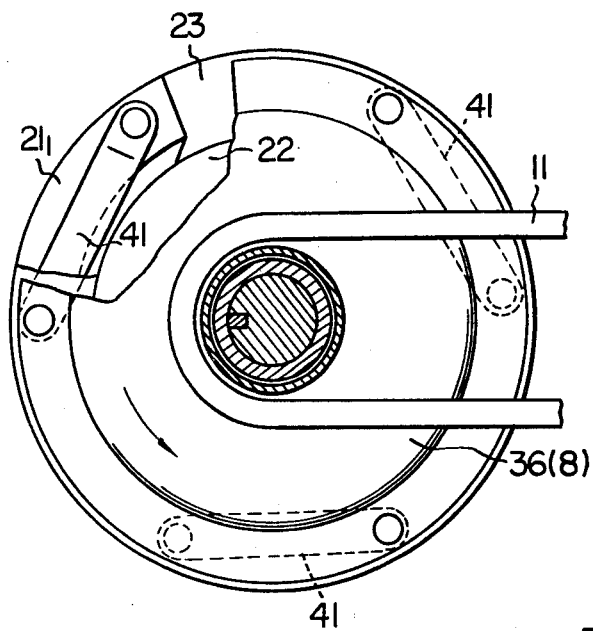
Figure 19:
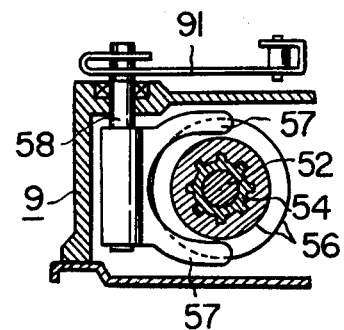
Figure 20:
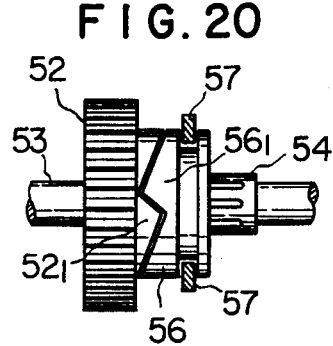
Figure 21:
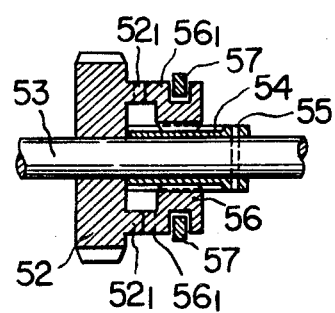
Figure 22:
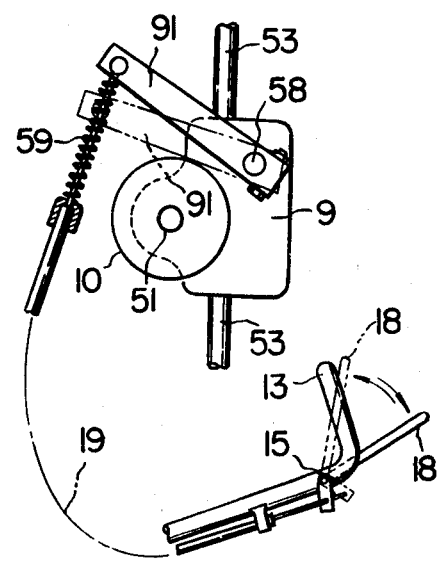

FIG. 5 through FIG. 16 inclusive illustrate preferred embodiments of the rotating and stopping device for the cutting blade, in which FIG. 5 is a longitudinal cross-section showing a clutch engagement in the first embodiment;

FIG. 6 is also a longitudinal cross-section showing disengaged state of the clutch;

FIG. 7 is a plan view of a ball retainer section;

FIGS. 8(I), 8(II), and 8(III) are respectively explanatory diagrams for the ball retainer sections;

FIGS. 9 and 12 are respectively enlarged, longitudinally cross-sectioned front view of the main part of other embodiments of the ball retainer in conjunction with a braking device;

FIG. 10 is a side view in longitudinal cross-section showing a relationship between a cam plate and the ball retainer in the embodiment shown in FIG. 9;

FIG. 11 is a view for explanation of the ball retainer when a projection is used in place of the ball;

FIG. 13 is a front view in longitudinal cross-section showing an engaged state of the clutch in its second embodiment;

FIG. 14 is also a front view in longitudinal cross-section showing a disengaged state of the clutch;

FIG. 15 is a plan view, partly cut away as well as in cross-section, of the ball retainer section taken along the line A—A in FIG. 13; and FIG. 16 is a plan view, partly cut away as well as in cross-section of the clutch section taken along the line B—B in FIG. 13; and FIG. 17 through FIG. 22 inclusive show a preferred embodiment of the self-driving and stopping device for the lawn mowing machine, in which FIG. 17 is a side elevational view in longitudinal cross-section of the device;

FIG. 18 is a front view in longitudinal cross-section of the device;

FIG. 19 is also a side elevational view in longitudinal cross-section showing a shifter and a shift fork sections;

FIG. 20 is an enlarged front view of the clutch section;

FIG. 21 is the same front view in longitudinal cross-section of the clutch in FIG. 20; and FIG. 22 shows an inter-relationship between the operating lever and the self-driving and stopping device for the machine body.

DETAILED DESCRIPTION OF PREFERRED EMBODIMENTS

Figure 1:
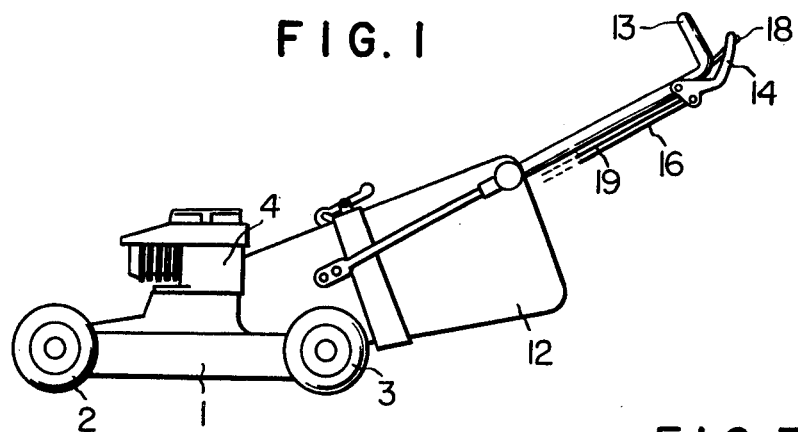
FIG. 1 is a schematic side elevational view of the overall lawn mowing machine according to the present invention.
Figure 2:
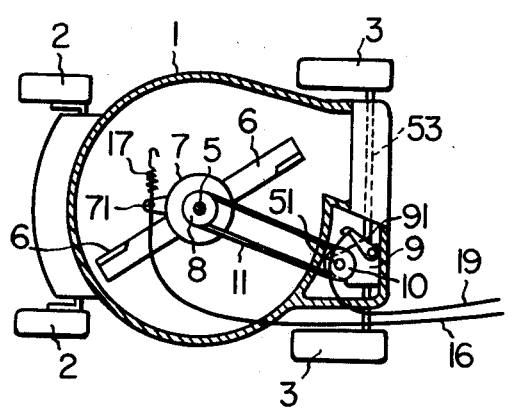
FIG. 2 is a plan view, partly in cross-section, showing a housing section for the cutting blade of the lawn mowing machine shown in FIG. 1.

Structure of the Gripping Levers for Operating Cutting Blade and Machine Body Referring to FIGS. 1 and 2, a reference numeral 1 designates a housing for accommodating therein a disc-shaped cutting blade and with its bottom being open, numerals 2, 2 refer to the front wheels, numerals 3, 3 refer to the rear wheels, a numeral 4 refers to a prime mover mounted at the substantially center part on the upper surface of the housing 1 with an output shaft thereof being projected downwardly into the housing, a numeral 6 refers to a cutting blade fixed to the bottom end of the output shaft 5 through the rotating and stopping device 7 for the cutting blade, a numeral 8 is a pulley integrally fitted on an appropriate portion of the output shaft 5, a reference numeral 9 designates a self-driving transmission, a reference numeral 10 designates another pulley (driven pulley) integral with an input shaft of its transmission mechanism, a numeral 11 is a V-shaped belt extended between the pulley 10 and the pulley 8 at the side of the prime mover output shaft 5, a numeral 12 refers to a grass collecting bucket connected to the housing 1 in a freely detachable and attachable manner, and a numeral 13 refers to a steering handle.

A reference numeral 14 (FIGS. 1, 3 and 4) designates a gripping lever for on-and-off operations of the cutting blade rotating and stopping device 7. The lever is fitted on the steering handle 13 in a freely rotatable manner around a shaft 15. The lever 14 and an actuator 71 of the device 7 are connected each other with a wire 16. The actuator 71 is pulled by a return spring 17 and is usually held at its off(inoperative)-position. Along with this, the wire 16 is also pulled, whereby the lever 14 is usually maintained in an open state as shown in the drawing off the handle 13 around the shaft 15 as the center of oscillation.

A reference numeral 18 is a gripping lever for on-and-off operations of the abovementioned self-driving transmission mechanism 9. The lever is rotatably fitted around the shaft 15 with respect to the handle 13. This lever 18 is connected with an actuator 91 of the transmission mechanism 9 by means of a wiree 19. The actuator 91 is usually pulled by a return spring 59 (FIG. 22) and maintained at an off(inoperative)-position. Along with this, the wire 19 is also pulled and the lever 18, same as the abovementioned lever 14, is usually maintained at an open state, as shown in the drawing, off the handle 13 around the shaft 15.

In the state of the prime mover 4 being started, when the lever 14 is gripped toward the handle 13 around the shaft 15 as the center of oscillation against the return spring 17, the actuator 71 of the cutting blade rotating and stopping device 7 is at the on(operative)-position due to its being pulled by the wire 16, whereby the shaft 5 and the cutting blade 6 are integrally connected to rotate the cutting blade.

Also, when the lever 18 is similarly gripped toward the handle 13 around the shaft 15 as the center of oscillation against the return spring at the side of the transmission mechanism 9, the actuator 91 of the transmission mechanism 9 is brought to an operative position due to its being pulled by the wire 19 with the result that rotation of the pulley 8 integral with the drive shaft 5 is transmitted to the side of the transmission mechanism 9 through the belt 11 and the pulley 10, whereby the lawn mowing machine is self-driven.

Consequently, when both levers 14 and 18 are gripped together, it becomes possible to perform the lawn mowing in the self-driving mode of the machine, while, when the lever 14 alone is gripped, the cutting blade 6 only rotates and the lawn mowing operation can be done in a hand-pushing mode.

The grass cut by the rotating cutting blade 6 is caused to fly due to centrifugal force from rotation of the cutting blade 6, and is collected into the grass collecting bag 12 from the housing 1.

Figure 3:
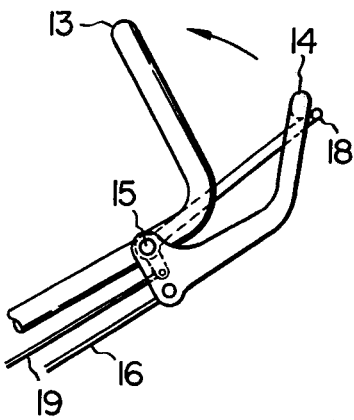
FIG. 3 is a side elevational view of an operating lever section for the lawn mowing machine shown in FIG. 1.
Figure 4:
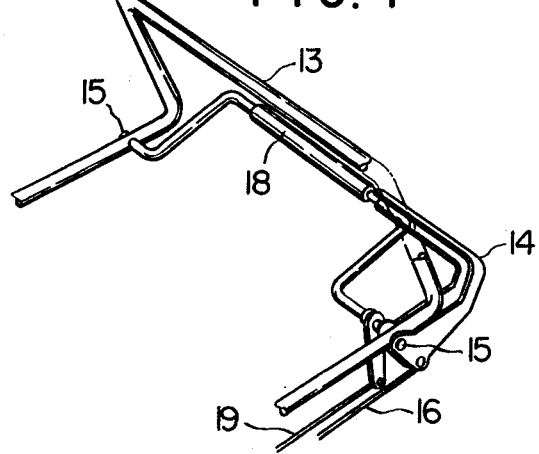
FIG. 4 is a perspective view of the operating lever section shown in FIG. 3.

The illustrated embodiment in FIGS. 1, 3 and 4 shows such a construction that one end part of the gripping lever 18 for the self-driving operation of the lawn mowing machine is overlapped with one end part of the gripping lever 14 for the lawn cutting blade operation. In this construction, when the lever 18 is gripped for the self-driving operation, the lever 14 also follows the oscillating direction of the handle 13 around the shaft 15. Also, the lever 14 can be gripped from the lawn mowing operation independently of the lever 18. In other words, when only the lever 14 is gripped, the cutting blade 6 alone rotates and the machine does not drive by itself. Therefore, when it is desired to carry out the lawn cutting operation in the hand-pushing mode, this lever 14 alone can be simply gripped. Further, when it is desired to carry out the cutting operation in the self-driving mode of the lawn mower, the lever 18 may be gripped, whereupon the lever 14 also rotates in the operative direction, and, so far as this lever 18 is continuously gripped, the rotational condition of the lever 14 is maintained, whereby the cutting blade 6 is rotated and the transmission mechanism is also kept in its operative state to cause the lawn mower to be in the self-driving mode.

Accordingly, in the case of the hand-pushing mode, the lever 14 may be gripped, while, in the case of the self-driving mode, the lever 18 may be gripped, hence the above-described objective can be well attained.

Structure of the Blade Rotating and Stopping Device 7

FIGS. 5 through 16 inclusive show preferred embodiments of the lawn cutting blade rotating and stopping device 7.

In FIG. 5, the cutting blade 6 is fixed onto a cutting blade rotational shaft 21 which is fitted at the bottom end of the prime mover shaft 5 through a bearing 20 in a manner freely rotatable therearound. One of the engagement member 22 of the friction clutch is fixed onto the prime mover shaft 5, and the other engagement member 23 thereof is fitted onto the lawn cutting blade rotational shaft 21 with a spline connection so that it may be rotated together with the shaft 21 as well as may be slidable in the axial direction thereof. A clutch spring 25 which is so energized that the movable engagement part 23 may be always press-contacted to the engagement member 22 at the fixed side is provided on this movable engagement member 23. A reference numeral 26 designates a frictional pad which is unmovably attached to the contact surface of both engagement members 22 and 23.

A rotatory disc 27 of the disc brake device is integrally provided with the movable engagement member 23 of the abovementioned friction clutch, and is maintained in a relationship, in which the rotatory disc 27 may contact a fixed braking disc 28 provided at the lower surface of the machine body 1 at the time of separation of the engagement members 22 and 23 of the friction clutch device. A reference numeral 29 designates a frictional pad unmovably attached to the surface of the control disc 28.

A cam plate 31 is fixed around the prime mover shaft 5 through a bearing 30 alongside the lower surface of the machine body 1. A reference numeral 32 designates a stopped projection which projects from the machine body 1 to be engaged with the cam plate 31 to hinder its excessive rotation. In the illustrated embodiment, the abovementioned fixed braking disc 28 is secured to the cam plate 31. It is to be noted that this fixed control disc 28 may be secured to the machine body 1.

A plurality of circumferential cam grooves 33 (FIG. 8) are formed on the surface opposite to the rotatory disc 27 of the abovementioned cam plate 31, and a retainer 35 which holds therein a plurality of balls 34 to be engaged with each of the cam groove 33 is fitted between the cam plate 31 and the rotatory disc 27 in a manner to be reciprocatingly rotatable around the circumferential direction of the disc. Then, the actuator 71 of the abovementioned retainer 35 (FIGS. 4 to 7) and the lever 14 fitted in the vicinity of the gripping section of the handle 13 (FIGS. 1, 3 and 4)—cutting blade rotating and stopping lever) are mutually connected by the flexible wire 16. When the lever 14 is gripped together with the gripping section of the handle 13, the retainer 35 is rotated against force of the return spring 17 (FIGS. 4 and 7) in the direction where the balls 34 are led into the deep side of the cam grooves 33.

When the prime mover 4 is started, and the lever 14 is gripped together with the gripping section of the handle 13, the retainer 35 is rotated as shown by the chain line in FIG. 7 through the flexible wire 16, whereby the balls 34 are shifted to the deepest position in the cam grooves 33 as shown in FIG 8(I). Upon movement of the balls, the movable engagement member 23 and the rotatory disc 27 integral therewith are pushed upward by force of the clutch spring 25, and the movable engagement member 23 is press-contacted to the fixed engagement member 22 as shown in FIG. 5, whereby the rotatory disc 27 is separated from thefixed braking disc 28 at the same time. In other words, rotation of the prime mover 5 is transmitted to the lawn cutting blade 6 due to connection between the friction clutch members 22 and 23.

The illustrated embodiment is of such a construction that a member 36 to connect the movable engagement member 23 of the clutch and the rotatory disc 27 of the brake is also used for the pulley 8 in FIG. 4, over which the wheel driving belt 11 is extended. When the lawn cutting blade 6 starts its rotation, the belt 11 simultaneously starts its rotation.

When an operator leaves his hand off the handle 13 to release the lever 14, the retainer 35 returns to the position shown in a solid line in FIG. 7 due to force of the return spring 17. As the result, the lever 14 assumes a state as shown in FIG. 1, wherein the lever 14 is separated from the handle 13, and the balls 34 move along the cam grooves 33 as shown in FIGS. 8(II) and 8(III) to arrive at the shallowest position thereof. Then, the balls 34 are pushed to lower into the cam grooves 33 due to the wedging action, on account of which the rotatory disc 27 and the movable engagement member 23 are pushed down against force of the clutch spring 25, and the movable engagement member 23 is separated from the fixed engagement member 22 as shown in FIG. 6. In more detail, the clutch is disconnected, and the rotatory disc 27 is pushed to the fixed braking disc 28 to function as the brake, whereby the lawn cutting blade 6 stops, while the shaft 5 of the prime mover remains in its rotation. The disc brake members 27 and 28 are so set that they may start working after the friction clutch members 22 and 23 are perfectly disconnected. (The up-and-down movement of the disc 27 by the rotational operation of the balls 34 and the retainer 35 is highly advantageous in that friction to the disc 27 is very small and the operation can be performed with a small force.)

That is to say, both prime mover shaft 5 and the rotational shaft 21 of the lawn cutting blade 6 are mutually interlocked by the friction clutch members 22 and 23 which are brought in engagement by gripping of the lever 14 provided at the handle 13, and the disc brake members 27 and 28 which function as the brake at the time of the clutch separation are provided between the movable engagement member 23 of the abovementioned clutch and the fixed member 28 at the side of the prime mover. Therefore, even when the prime mover 4 is started, the lawn cutting blade 6 does not rotate so far as the lever 14 is gripped.

When the operator leaves his hand off the lever 14 during the lawn mowing operation, the rotational power to the cutting blade 6 is interrupted, and, at the same time, there applies braking force to the rotatory disc 27 integrally joined to the lawn cutting blade 6, whereby the blade 6 immediately stops and safety is secured even when the operator unexpectedly touches the same.

Since the prime mover 4 is still in rotation, even when the cutting blade 6 stops rotation, there is no necessity for re-starting the prime mover at every time the lawn mowing operation is to be resumed. In view of this, the construction is very effective at the power transmission device for the power-operated lawn mower.

In the embodiments shown in FIGS. 5 to 8, the construction is such that the brake is applied by directly pushing down the rotatory disc 27 by means of the balls 34. Another embodiment to be explained in reference to FIGS. 9 to 12 is of such a construction that the rotatory disc 27 is indirectly pushed down by means of the retainer 35 and other members.

The embodiment shown in FIGS. 9 and 10 is of such a construction that, when the lever 14 is released, the retainer 35 lowers against the return spring 37 by the function of the cam grooves 33 and the balls 34, while it is rotating in the returning direction, and the retainer 35 contacts the rotatory disc 27 to push the same to the fixed control disc 28 to actuate the brake. A reference numeral 29' designates a frictional pad unmovably attached to the surface opposite to the rotatory disc 27 of the retainer 35.

In the case of FIGS. 9 and 10, it is also possible that, in place of the balls 34, projections 34' may be formed on the surface opposite to the cam plate 31 of the retainer 35 as shown in FIG. 11, and these projections may be engaged with the cam grooves 33. FIG. 11(I) shows a state, in which the brake is not applied during the lawn cutting operation, and FIG. 11(II) shows a state, in which the lawn mowing operation is stopped, when the retainer 35 lowers to apply the brake to the disc.

The embodiment shown in FIG. 12 is of such a construction that, when the retainer 35 rotates in the returning direction by release of the lever 14, a pressing plate 40 which rotates along with the retainer 35, but which is movable vertically along the spline 38 and is press-contacted to the ball 34 by the spring 39 is pushed downward through the ball 34, and this pressing plate 40 further contacts the rotatory disc 27 to push the same to the fixed braking disc 28.

The embodiment shown in FIG. 13 is of such a construction that, in order to mount the movable engagement member 23 of the friction clutch on the lawn cutting rotational shaft 21 in a manner to be rotatable therealong as well as movable in the axial direction, the circumferential section of the movable engagement member 23 and a flange $21_1$ integral with the lawn cutting rotational shaft 21 are connected with a plurality of leaf springs 41 along the circumferential direction, as shown in FIG. 16.

Also, the fixed braking disc 28 of the disc brake is hangingly mounted beneath the machine body 1 by means of a plurality of leaf springs 42 in a manner to be movable up and down, the cam plate 31 rotating in association with the lever 14 to cause the braking disc 28 to move up and down through the balls 34 (FIG. 15).

FIG. 13 shows a state, in which the lawn cutting blade 6 is in rotation. When the operator leaves his hand off the lever 14, the cam plate 31 rotates by force of the return spring 17 to urge the braking disc 28 to the rotatory disc 27 through the balls 34 as shown in FIG. 14 to further push down the rotatory disc 27 and the movable engagement member 23 integral therewith. That is, when the brake works, the clutch is disconnected simultaneously, and the lawn cutting blade 6 stops, while the prime mover is in operation. Therefore, by the use of the leaf springs 41 and 42 for mounting the movable engagement member 23 of the clutch and the fixed braking disc 28 of the brake device, there accrue such advantages that frictional portions in the machine are less than in the case of the spline connection, and rusting and invasion of any foreign matters are least liable to occur, so that constant and smooth operations are assured.

Structure of the Driving and Stopping Device 9 for Lawn Mowing Machine

FIGS. 17 through 22 inclusive illustrate one embodiment of the driving and stopping device for the lawn mowing machine. In the drawings, a reference numeral 50 designates a worm formed on the peripheral surface of the input shaft 51 which is integral with the pulley 10, a numeral 52 refers to a worm gear loosely fitted on a drive shaft 53 for driving the rear wheels, the worm gear being constantly meshed with the worm 52. A numeral 54 refers to a spline shaft which is integrally mounted on the drive shaft 53 through a stopper pin 55, and a numeral 56 refers to a shifter which is mounted on the spline shaft 54, and freely slidable along the axial direction of the spline.

A reference numeral 57 designates a shift fork to slide-move the shifter 56 to the worm gear 52 in a manner to be close to and away from the worm gear. A numeral 58 refers to a center shaft for rotation of the shift fork. A numeral 91 refers to an actuator (lever) which is integrally mounted on the shaft 58, the actuator being connected with the gripping lever 18 for the on-and-off operation of the lawn mowing machine in its self-driving mode by means of the calbe 19. A numeral 59 designates a return spring which constantly urges the actuator 91 and holds it at the inoperative position (a position in solid line in FIG. 22). With this return spring, the wire 19 is also pulled, and the lever 18 for on-and-off operations in the self-driving mode is usually held in the state shown in solid line in FIG. 22, wherein it is separated from the handle 13 and in the open condition around the shaft 15 as the center of oscillation.

When the actuator 91 is at an off(inoperative)-position as mentioned above, the shift fork 57 is held at a position where it rotates in a direction of causing the shifter 56 to be separated from the worm gear 52 around the shaft 58 as the center, whereby the clutches $52_1$ and $56_1$ are brought in their off-state (FIG. 18). Accordingly, while the work gear 52 rotates upon its receipt of the rotational force from the belt 11 through the pulley 10, the shaft 51, and the worm 50, it idles over the drive shaft 53, hence the lawn mowing machine does not move in the self-driving fashion.

When the lever 18 for the self-driving operation, the lawn mowing machine is gripped with respect to the handle 13 against force of the return spring 59 (chain line in FIG. 22), the actuator 91 is pulled to the "chain-line" position by the wire 19. Along with this, the shift fork 57 rotates in a direction to cause the shifter 56 to slide toward the worm gear 52, whereby the clutches $52_1$ and $56_1$ become "on"-state (FIGS. 20 and 21). As the result, the shifter 56, the spline shaft 54 and the drive shaft 53 rotate along with the worm gear 52 to drive the rear wheels 3, 3. Therefore, as far as the lever 14 is gripped continuously, the lawn mowing machine moves in the self-driving fashion.

Incidentally, the clutches $52_1$ and $56_1$ may be formed to have a saw-tooth surface so as to attain rigid contact therebetween. Also, these clutches may be integrally formed on the respective opposed surfaces of the worm gear 52 and the shifter 56.

What is claimed is:

1. A lawn mower, comprising in combination:
   (a) a machine body;
   (b) a prime mover having an output shaft extending therefrom, and mounted on one part of said machine body;
   (c) a lawn cutting blade operatively joined to said output shaft;
   (d) means for rotating and stopping said lawn cutting blade;
   (e) means for driving and stopping said machine body in a self-driving mode;
   (f) pulley means to interlock said means (d) and (e);
   (g) a steering handle extending from said machine body;
   (h) first lever means provided at one part of said steering handle for on-and-off operation of said rotating and stopping means for said cutting blade; and
   (i) second lever means also provided at one part of said steering handle and in contiguity to said first lever means for on-and-off operations of said driving and stopping means for said machine body, said first lever means being operable independently of said second lever means, and said second lever means, when gripped, being engaged with said first lever means to cause said first lever means to rotate in its operative direction, and maintain the same at its operational position.

2. The lawn mower as set forth in claim 1, wherein said first lever means for on-and-off operations of said rotating and stopping means for said cutting blade is a gripping handle which is oscillatably provided at one end part to an operator's hand around a rotational axis, and is operatively connected with an actuating means provided in said means for rotating and stopping said lawn cutting blade through a wire, and which brings the cutting blade in its operative state when the first lever means is gripped, and stops the blade operation when said lever means is released from gripping.

3. The lawn mower as set forth in claim 1, wherein said second lever means for on-and-off operations of said driving and stopping means for said machine body is a gripping handle which is oscillatably provided at the end part to an operator's hand around the same rotational axis as that of said first lever means, said second lever means being operatively connected with an actuating means provided in said means for driving and stopping said machine body, and, when gripped, it also engages said first lever means to actuate said means for on-and-off operations of said rotating and stopping means for said cutting blade, and actuates said means for driving and stopping said machine body in the self-driving mode.

4. The lawn mower as written in claim 1, wherein said means for rotating and stopping said lawn cutting blade comprises a cutting blade rotational shaft loosely and rotatably fitted around said prime mover output shaft, first movable engagement member of a frictional clutch spline-fitted to said cutting blade rotational shaft in a manner rotatable therewith and movable in the axial direction, a second engagement member fixedly secured to said output shaft of the prime mover, a clutch spring to constantly urge said first movable engagement member to said second fixed engagement member, a rotatory disc of a disc brake integrally joined with said movable engagement member of said frictional clutch, a fixed braking disc provided at the lower surface of said machine body so as to contact to said rotatory disc at the time of disengagement of said frictional clutch, a cam plate member rotatably fixed around said output shaft of said prime mover beneath the machine body, said cam plate having a plurality of circumferential cam grooves on the opposite surface to said rotatory disc, stopper means to restrict rotational movement of said cam plate member, ball retaining means to hold therein a plurality of balls to be engaged with said cam grooves provided reciprocatingly and movably in the circumferential direction between said cam plate member and said rotatory disc, said ball retaining means having an actuator means at one peripheral part thereof to be connected with said first lever means through a flexible wire, and a return spring means to constantly maintain said rotatory disc in contact with said fixed braking disc and the clutch in a disengaged state, when said first lever means is released from gripping.

5. The lawn mower as set forth in claim 1, wherein said means for driving and stopping said machine body comprises a wheel drive shaft, a drive power input shaft having a worm formed on the peripheral surface thereof, a worm gear mounted on said wheel drive shaft, said gear being constantly meshed with said worm formed on said input shaft, spline shaft fitted on said drive shaft, a shifter means spline-connected on said spline shaft in a freely slidable manner along said spline shaft, a shift fork means to contact and separate said shifter means to and from said worm gear, an actuator means fixed on a rotational shaft for said shift fork and which is connected with said second lever means with a wire, and a return spring means to constantly maintain said actuator at an inoperative position of said driving and stopping means when said second lever means is released from fripping.

6. The lawn mower as set forth in claim 5, wherein said clutch means on either side of said worm gear and said shifter are shaped in a saw tooth shape so as to secure rigid engagement therebetween.

7. The lawn mower as set forth in claim 5, wherein said clutch means on either side of said worm gear and said shifter are integrally formed with said respective worm gear and shifter means.

8. The lawn mower as set forth in claim 4, wherein said brake application is effected by said ball retaining means which pushes down said rotatory disc toward said fixed braking disc.

9. The lawn mower as set forth in claim 4, wherein said brake application is effected by a pressing plate member provided beneath said ball retaining means, through which said rotatory disc is pushed down to said fixed braking disc.

10. The lawn mower as set forth in claim 4, 8, or 9, wherein said balls are replaced by projections to slide along said cam grooves.

11. The lawn mower as set forth in claim 1, wherein said means for rotating and stopping said lawn cutting blade and said means for driving and stopping said machine body in a self-driving mode are operatively associated with pulleys and a pulley belt to connect the same.

* * * * *